United States Patent
Kashikura et al.

(10) Patent No.: US 8,171,610 B2
(45) Date of Patent: May 8, 2012

(54) RECYCLING SYSTEM AND DISASSEMBLING AND CLASSIFYING METHOD

(75) Inventors: Toshiyuki Kashikura, Chiba (JP); Satosu Souma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1896 days.

(21) Appl. No.: 11/319,130

(22) Filed: Dec. 28, 2005

(65) Prior Publication Data

US 2006/0180518 A1 Aug. 17, 2006

(30) Foreign Application Priority Data

Jan. 27, 2005 (JP) ................................ 2005-020074
Oct. 14, 2005 (JP) ................................ 2005-300734

(51) Int. Cl.
*B07B 13/00* (2006.01)
*B07C 5/00* (2006.01)

(52) U.S. Cl. ...... 29/403.1; 29/403.3; 209/577; 209/588; 209/589

(58) Field of Classification Search ................ 29/403.1, 29/403.3; 209/576, 577, 583, 588, 589
See application file for complete search history.

(56) References Cited

U.S. PATENT DOCUMENTS

| | | | | |
|---|---|---|---|---|
| 4,028,267 A * | 6/1977 | Christell et al. | ........... | 250/359.1 |
| 4,919,534 A * | 4/1990 | Reed | ........... | 356/73 |
| 5,141,110 A * | 8/1992 | Trischan et al. | ........... | 209/524 |
| 5,201,921 A * | 4/1993 | Luttermann et al. | ........... | 8/506 |
| 5,318,172 A * | 6/1994 | Kenny et al. | ........... | 209/524 |
| 5,339,962 A * | 8/1994 | Sommer et al. | ........... | 209/576 |
| 5,468,779 A * | 11/1995 | Yamamoto et al. | ........... | 521/46.5 |
| 5,553,714 A * | 9/1996 | Cushman et al. | ........... | 209/577 |
| 5,675,416 A * | 10/1997 | Campbell et al. | ........... | 356/367 |
| 5,794,788 A * | 8/1998 | Massen | ........... | 209/524 |
| 5,965,858 A * | 10/1999 | Suzuki et al. | ........... | 235/375 |
| RE36,537 E * | 2/2000 | Sommer, Jr. et al. | ........... | 209/576 |
| 6,487,377 B2 * | 11/2002 | Naito et al. | ........... | 399/12 |
| 6,633,795 B1 * | 10/2003 | Suzuki et al. | ........... | 700/213 |
| 6,639,872 B1 * | 10/2003 | Rein | ........... | 367/140 |
| 6,679,442 B2 | 1/2004 | Morii et al. | | |
| 6,842,596 B2 | 1/2005 | Morii et al. | | |
| 6,914,678 B1 * | 7/2005 | Ulrichsen et al. | ........... | 356/429 |
| 7,000,857 B2 * | 2/2006 | Morii et al. | ........... | 241/24.1 |
| 7,006,884 B2 * | 2/2006 | Yamakado et al. | ........... | 700/97 |
| 7,054,797 B2 * | 5/2006 | Kobayashi et al. | ........... | 703/2 |

(Continued)

FOREIGN PATENT DOCUMENTS

EP 441012 A2 * 8/1991

(Continued)

OTHER PUBLICATIONS

Japanese Office Action dated Sep. 14, 2010, Application No. 2005-300734, which corresponds to U.S. Appl. No. 11/319,130.

*Primary Examiner* — Essama Omgba
(74) *Attorney, Agent, or Firm* — Oblon, Spivak, McClelland, Maier & Neustadt, L.L.P.

(57) ABSTRACT

In a recycling system of the present invention for collecting a subject of recycling, which contains plastics, from the market and reprocessing the plastics to thereby produce a recycled product, the plastics contains a line spectrum radiation that radiates light when receiving ultraviolet rays or an electromagnetic wave. Recycle information particular to the subject of recycling is identified on the basis of the wavelengths of light radiated from the line spectrum radiation.

5 Claims, 5 Drawing Sheets

U.S. PATENT DOCUMENTS

| | | | |
|---|---|---|---|
| 7,080,435 B2 * | 7/2006 | Yamakado et al. | 29/403.3 |
| 7,082,660 B2 * | 8/2006 | Kato et al. | 29/401.1 |
| 7,152,002 B2 * | 12/2006 | Lingren et al. | 702/23 |
| 7,206,646 B2 * | 4/2007 | Nixon et al. | 700/83 |
| 7,219,042 B2 * | 5/2007 | Kobayashi et al. | 703/6 |
| 7,326,871 B2 * | 2/2008 | Kenny et al. | 209/579 |
| 7,412,365 B2 * | 8/2008 | Kobayashi et al. | 703/6 |
| 7,564,943 B2 * | 7/2009 | Sommer et al. | 378/53 |
| 7,697,139 B2 * | 4/2010 | Fukazawa et al. | 356/369 |
| 7,720,727 B2 * | 5/2010 | Keyes et al. | 705/30 |
| 7,748,096 B2 * | 7/2010 | Yamakado et al. | 29/403.3 |
| 2002/0028080 A1 * | 3/2002 | Naito et al. | 399/12 |
| 2003/0044198 A1 * | 3/2003 | Kato et al. | 399/109 |
| 2003/0236345 A1 | 12/2003 | Morii et al. | |
| 2004/0005167 A1 | 1/2004 | Morii et al. | |
| 2004/0250396 A1 | 12/2004 | Morii et al. | |
| 2004/0250398 A1 | 12/2004 | Morii et al. | |
| 2005/0159989 A1 * | 7/2005 | Tsuno et al. | 705/7 |
| 2005/0249520 A1 * | 11/2005 | Yamamoto et al. | 399/109 |
| 2005/0267781 A1 * | 12/2005 | Kobayashi et al. | 705/2 |
| 2006/0010021 A1 * | 1/2006 | Kobayashi et al. | 705/7 |
| 2006/0070928 A1 * | 4/2006 | Lovhaugen et al. | 209/576 |
| 2007/0158245 A1 * | 7/2007 | Kenny et al. | 209/576 |
| 2008/0015720 A1 * | 1/2008 | Oyasato et al. | 700/97 |
| 2008/0257793 A1 * | 10/2008 | Valerio | 209/567 |
| 2010/0293019 A1 * | 11/2010 | Keyes et al. | 705/7 |
| 2011/0024332 A1 * | 2/2011 | St-Onge | 209/3.3 |

FOREIGN PATENT DOCUMENTS

| | | |
|---|---|---|
| JP | 2000-181958 | 6/2000 |
| JP | 2002-336832 | 11/2002 |
| JP | 2004-358427 | 12/2004 |
| KR | 2004010818 A * | 1/2004 |
| WO | 03/058549 A1 | 7/2003 |

* cited by examiner

RECYCLING SYSTEM AND DISASSEMBLING AND CLASSIFYING METHOD

BACKGROUND OF THE INVENTION

1. Field of the Invention

The present invention relates to a recycling system applicable to OA (Office Automation) equipment and/or household appliances and more particularly to a recycling system applicable to end-use products containing plastics.

2. Description of the Prior Art

It is a common practice with a recycling system to recycle used products collected from the market and produce recycled products with the resulting recycled materials in accordance with a production plan. Today, importance is attached to material recycling that disassembles and classifies the subject of collection into materials and executes some processing with the materials in order to produce recycled materials. With such material recycling, it is possible to produce entirely new parts by selectively using the recycled materials and apply the new parts to new end-use products having improved or renovated functions.

Material recycling includes closed-loop material recycling that reuses recycled materials for products producible with materials belonging to the same field as the recycled materials and open-loop material recycling that applies the recycled materials to products producible with materials belonging to a field different from the recycled materials. It may safely be said that closed-loop material recycling is advantageous over open-loop material recycling in that it recirculates resources a plurality of times, i.e., allows the same recycled materials to be repeatedly used. A specific system for smoothly effecting closed-loop material recycling is disclosed in, e.g., Japanese patent laid-open publication No. 2002-336832.

Figure 6:
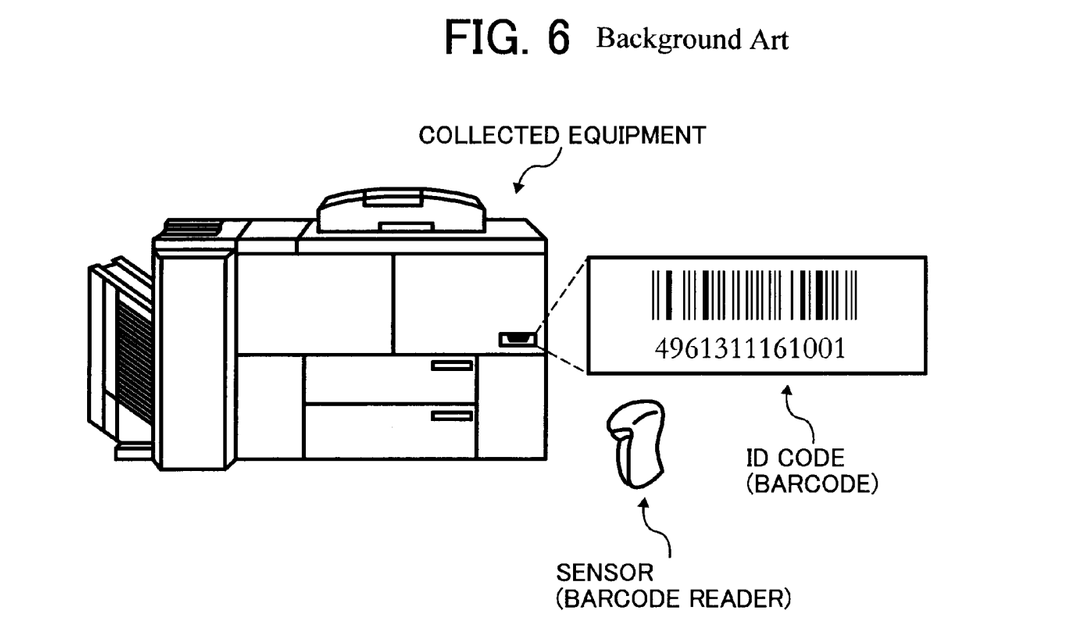
FIG. 6 is a view showing a conventional specific subject of recycling collected, a barcode or ID code attached thereto and a barcode reader or sensor for sensing it.

As stated above, a subject of recycling collected from the market is disassembled and classified into materials. As shown in FIG. 6, when a subject of recycling collected from the market is equipment, a barcode or similar ID (identification) code is usually provided on the equipment and includes the name and date of production of the equipment, a product number, recyclable materials, colors thereof and so forth. A disassembling and classifying sequence is executed on the basis of such information read out of the ID code by a barcode reader or similar sensor.

However, the problem with the ID code scheme is that the collected equipment and even the ID code thereof is sometimes smeared or damaged in dependence on the conditions of use, preventing the sensor from accurately sensing the ID code. Although the ID code may be implemented as, e.g., a magnetic code in order to solve the above problem, a magnetic code increases the cost of the sensing system. In addition, marks or codes are often molded together with parts constituting the collected equipment, particularly parts formed of plastics, and should be identified by eye. Identification by eye, however, is apt to bring about errors.

Further, an operator usually must disassemble and classify collected equipment placed on, e.g., a floor or a work table while moving around the equipment in accordance with an operation sequence written in a manual, resulting in an undesirable work environment. In addition, the work performed while watching a manual lacks efficiency and accuracy.

Moreover, the production of recycled products is planned after the confirmation of the number of collected equipments, preventing collection from being effected on an application basis and therefore making it inefficient. Also, the production plan of recycled products is dependent on the collection of equipments and is also inefficient.

SUMMARY OF THE INVENTION

It is an object of the present invention to provide a highly efficient recycling system capable of accurately identifying information particular to collected equipment without any error and a method capable of efficiency, accurately disassembling and classifying a subject of recycling collected from the market.

In a recycling system for collecting a subject of recycling, which contains plastics, from the market and reprocessing the plastics to thereby produce a recycled product of the present invention, the plastics contains a line spectrum radiation that radiates light when receiving ultraviolet rays or an electromagnetic wave. Recycle information particular to the subject of recycling is identified in accordance with the wavelengths of light radiated from the light spectrum radiation.

Also, in a disassembling and classifying method for a recycling system that collects a subject of recycling, which contains plastics, from the market and reprocesses the plastics to thereby produce a recycled product of the present invention, the plastics contains a line spectrum radiation that radiates light when receiving ultraviolet rays or an electromagnetic wave. Recycle information particular to the subject of recycling is identified in accordance with the wavelengths of light radiated from the light spectrum radiation. A disassembling and classifying sequence for the subject of recycling is stored in sequence storing means beforehand and displayed on a display during work.

BRIEF DESCRIPTION OF THE DRAWINGS

The above and other subjects, features and advantages of the present invention will become more apparent from the following detailed description taken with the accompanying drawings in which.

DESCRIPTION OF THE PREFERRED EMBODIMENTS

Figure 1:
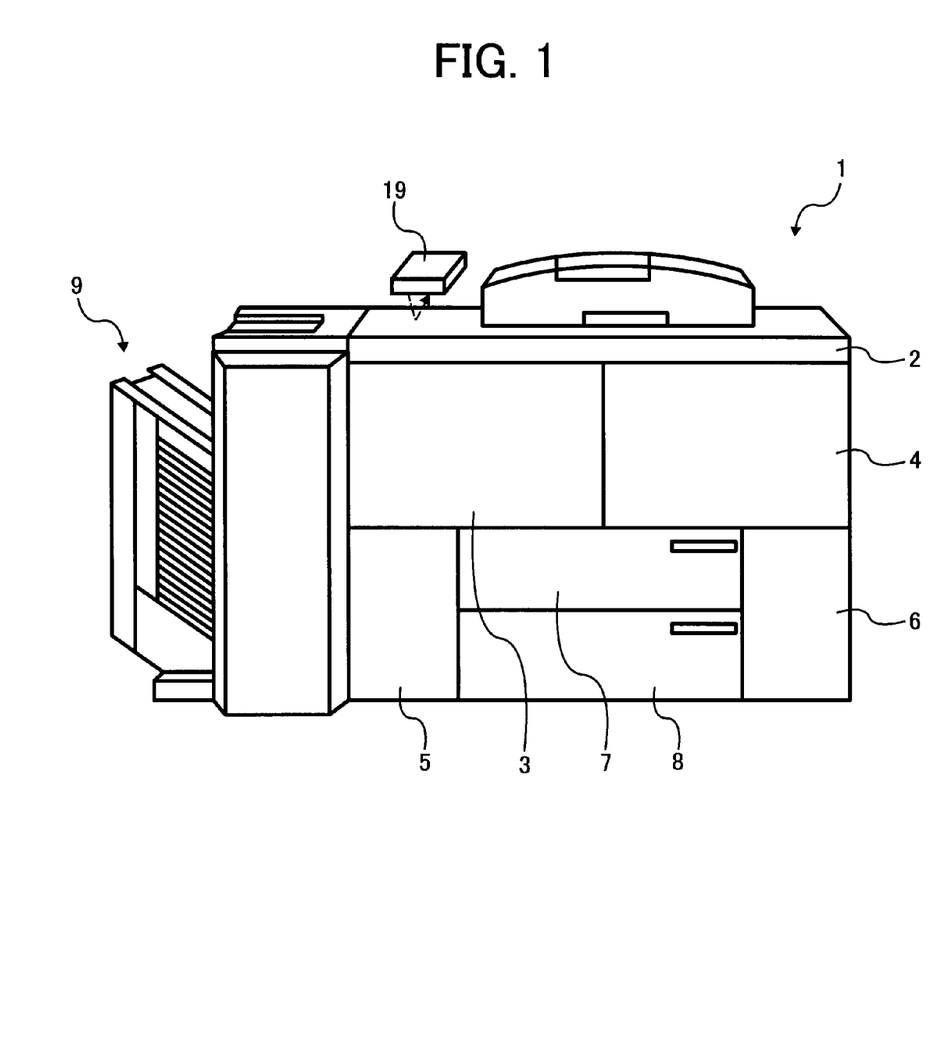
FIG. 1 is an external view showing an image forming apparatus or subject of recycling collected to which a first embodiment of the present invention is applied.

Referring to FIG. 1 of the drawings, an image forming apparatus is shown as a specific subject of recycling to be collected. As shown, the image forming apparatus, generally designated by the reference numeral 1, includes a top cover 2, front covers 3 and 4, front panels 5 and 6, front-loading type of sheet trays 7 and 8 and side panels not shown. A sorter 9 is mounted on the left side of the apparatus body as a specific form of a finisher. The image forming apparatus 1 is different from the apparatus of FIG. 6 in that it is not provided with a barcode or similar ID code.

The top cover 2 is formed of ABS (Acrylonitrile-Butadiene-Styrene) resin, PC (PolyCarbonate) resin, PS (Polycarbonate-Styrene) resin, PC-ABS resin, PC-PS resin or similar synthetic resin. An oxide fluorescent substance, which is a line spectrum radiation, is uniformly diffused in such resin, constituting a so-called Plagenom (trade name) substance. When ultraviolet rays or an electromagnetic wave is radiated toward an unspecified portion of the top cover 2, light reflected by the above oxide fluorescent substance is incident on a sensor 19. The resulting output of the sensor 19 is subject to spectrum analysis to thereby detect the recycle information of the image forming apparatus 1 on the basis of a plurality of line spectra contained in the reflected light.

The plurality of line spectra are used in the same manner as a barcode by having their strength ratios to a standard spectrum strength and spectrum wavelengths combined. More specifically, the sensed line spectra are analyzed to produce the name, date of production and product number of the image forming apparatus 1, materials to be recycled, colors of such materials and the names of parts to be recycled and other recycle information particular to the apparatus 1. These recycle information are stored in a storage, not shown, on the basis of each line spectrum strength ratio and each spectrum wavelength and displayed on a display, not shown, when sensed by the sensor 19. The line spectrum strength ratios and spectrum wavelengths stated above are controlled in terms of the kind and amount of the oxide fluorescent substance contained in the plastics such that the terms of the recycle information are different between image forming apparatuses 1 except for image forming apparatuses 1 of the same type and the same slot.

In the above configuration, one of members, constituting the image forming apparatus or end-use product 1 collected, or the subject of recycling, itself bears recycling information particular thereto, making the conventional time- and labor-consuming work for an operator to find a barcode or similar ID code by eye not necessary and therefore enhancing efficient operation. Further, because the recycling information can be detected from only part of the top cover 2, the information can be accurately detected even when the image forming apparatus 1 is smeared or broken. This allows the information of the subject of recycling to be accurately detected for thereby promoting noticeably accurate recycling.

In the illustrative embodiment, an oxide fluorescent substance or line spectrum radiation is contained in plastics that forms the top cover 2. Alternatively, the oxide fluorescent substance maybe contained in at least one of members of the image forming apparatus 1 formed of plastics. In such an alternative case, it is preferable to form at least one of the front-loading type of sheet cassettes 7 and 8, side panels, not shown, and a rear panel, not shown, from plastics and contain the oxide fluorescent substance therein.

While the image forming apparatus 1 to which the first embodiment is applied includes a plurality of parts including plastic parts and non-plastic parts, the first embodiment is, of course, similarly applicable to, e.g., cups, droppers or similar products entirely formed of plastics or case, toys or similar products constituted by a combination of plastic parts.

A second embodiment of the present invention will be described hereinafter. In the second embodiment, if the material to be recycled, represented by the recycle information analyzed in the first embodiment, is plastics, the oxide fluorescent substance is uniformly diffused in the material to be recycled. Parts formed of plastics that should be recycled include, in the case of the image forming apparatus 1, covers constituting a casing, toner bottles and a case of a developing unit. In this condition, the illustrative embodiment emits ultraviolet rays or an electromagnetic wave toward any portion or unspecified portion of the casing and then executes spectrum analysis with light reflected from the oxide fluorescent substance contained therein and then incident on the sensor 19, thereby detecting the information of the subject of recycling from a plurality of line spectra contained in the reflected light.

The plurality of line spectrum are used in the same manner as a barcode as in the first embodiment. More specifically, the sensed line spectra are analyzed to produce, e.g., the name of the subject to be recycled, the material to be recycled and color hereof, whether or not materials other than plastics are contained and the weight of recyclable plastics as recycle information. In the illustrative embodiment, the line spectrum strength ratios and spectrum wavelengths stated previously are control led in terms of the kind and amount of the oxide fluorescent substance contained in the plastics such that the terms of the recycle information are different between parts collected to be recycled.

Figure 2:
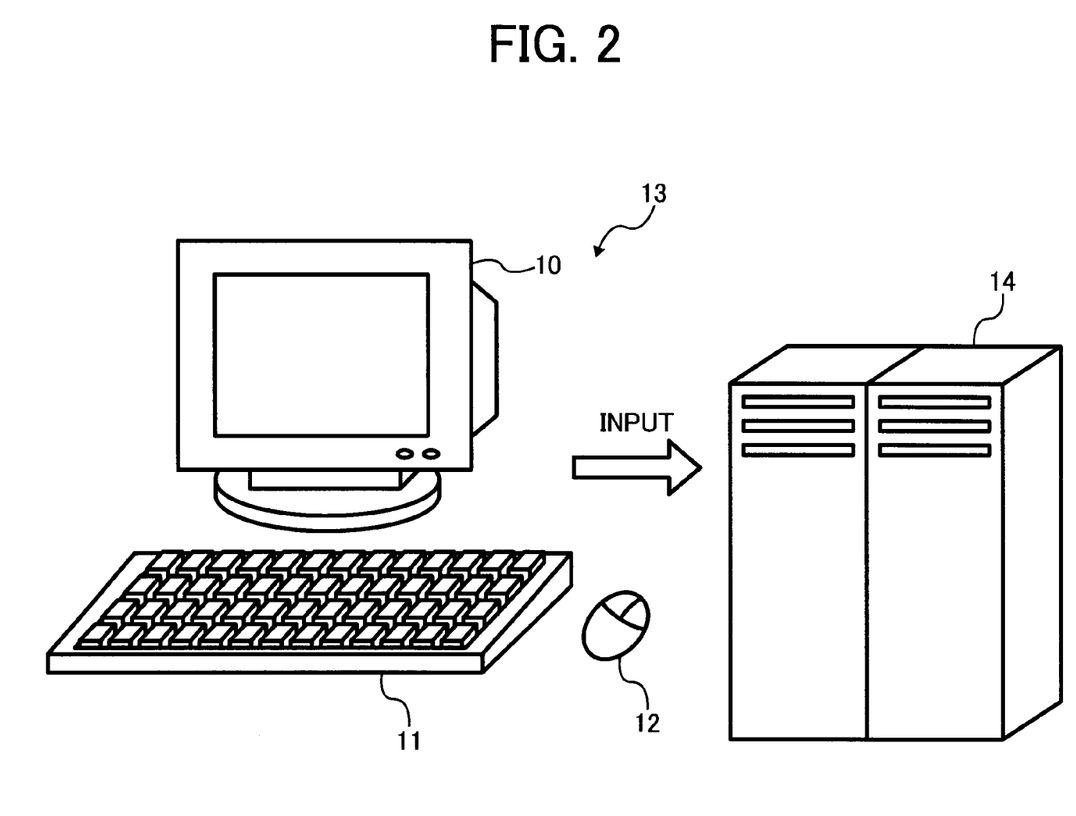
FIG. 2 is an external view showing an inputting device and production control information storing means for practicing a second embodiment of the present invention.

As shown in FIG. 2 specifically, the recycle information thus obtained from the subject of recycling are input to a server or production control information storing means 14 via an inputting device 13 made up of an inputting unit 10, a keyboard 11 and a mouse 12. The kinds materials, colors and weights of recyclable products, the amounts of the individual recyclable products planned for a week or a month and other product control information are stored in the server 14 beforehand. The server 14 compares the recycle information input on the inputting device 13 with the stored production control information. Subsequently, the server 14 commands, if the amount of plastics input on the inputting device 13 is short of the planned amount of production, closed-loop material recycling that causes recycled products to be produced from the collected plastics in accordance with the plan or commands, if the above amount of plastics is in excess of the planned amount, open-loop material recycling that causes the collected plastics to be transferred to another production line also using plastics.

With the above configuration, the illustrative embodiment not only allows the production of recycled products to be easily programmed, but also facilitates the arrangement of production based on closed-loop material recycling or open-loop material recycling. This successfully makes production arrangements noticeably clear and enhances the efficiency of production steps to an unprecedented degree.

A third embodiment of the present invention will be described hereinafter. The third embodiment is essentially similar to the second embodiment except that it determines whether or not a plastic particle collected for recycling is reusable and, if it is not reusable, estimates a recycling cost. An oxide fluorescent substance is uniformly diffused in the above part. Light reflected by the oxide fluorescent substance is sensed by the sensor 19, FIG. 1, and subjected to spectrum analysis, so that recycle information is detected from the resulting plurality of line spectra, as stated earlier. In the illustrative embodiment, the recycle information includes the kind of plastics constituting the collected part, the grade of the plastics, the kind and mass of a fire retardant, the date of molding, a part number, color and so forth.

Figure 7:
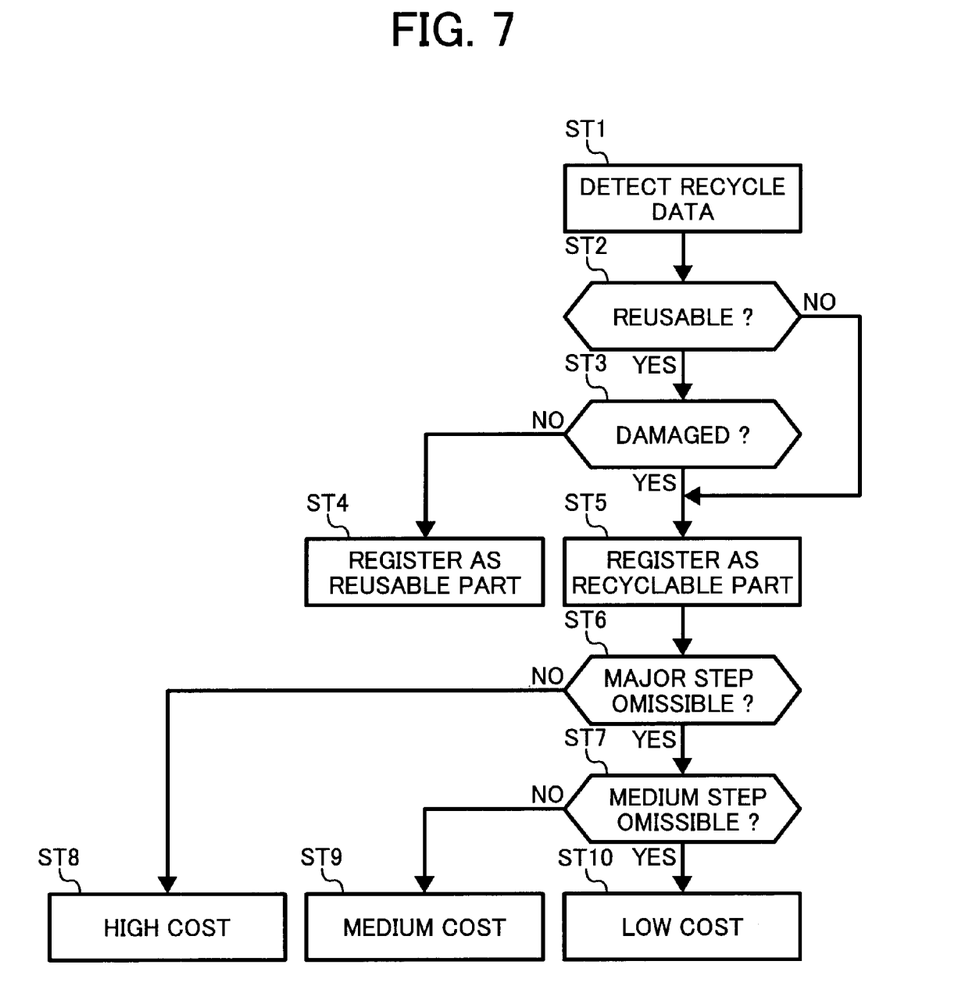
FIG. 7 is a flowchart demonstrating a specific decision procedure representative of a third embodiment of the present invention.

FIG. 7 is a flowchart demonstrating a decision procedure unique to the illustrative embodiment. As shown, when ultraviolet rays or an electromagnetic wave is radiated toward an unspecified portion of a collected part, light is reflected by an oxide fluorescent substance contained in the part and incident on the sensor 19, FIG. 1, so that recycle information particular to the part is detected (step ST1) The recycle information is fed to sequence inputting means, not shown. In response, the information inputting means determines, by referencing the part number, whether or not the part is reusable (step ST2). If the answer of the step ST2 is positive, Y, meaning that the collected part is reusable, then whether or not the reusable part is damaged or not is determined (step ST3). If the answer of the step ST3 is negative, N, meaning that the part is not damaged, the part is determined to be reusable and registered as a reusable part (step ST4).

On the other hand, if the collected part is not reusable (N, step ST2) or if it is damaged although reusable (Y, step ST3), the part is registered as a recyclable material (step ST5) Subsequently, whether or not a major step or steps included in a recycling process are omissible is determined (step ST6). If the major step is not omissible (N, step ST6), the recycling cost is estimated to be high. If the major step is omissible (Y, step ST6), whether or not a medium step or steps also included in the recycling process are omissible is determined (step ST7) If the medium step is not omissible (N, step ST7), the recycling cost is estimated to be medium. If the medium step is omissible (Y, stop ST7), the recycling cost is estimated to be low.

The steps S6 and S7 stated above are executed on the basis of the recycle information of the collected part. The date of molding, for example, shows the variation of the material due to aging; if the collected part is relatively new and therefore not lowered in strength, it is determined that the step of, e.g., adding a reinforcement is omissible. Also, a part number shows the degree of degeneration ascribable to heat, force and so forth, i.e., stress or similar factor acting on each part, allowing the decision on omission to be made.

As stated above, by accurately detecting the information of a part collected for recycling, the illustrative embodiment can determine whether or not the collected part is reusable and can estimate, if the part is not reusable, a recycling cost necessary for the part, thereby enhancing clear production planning and efficient production to a significant degree. Further, the illustrative embodiment can obtain information relating to the mass of a part registered at a recycling part to thereby facilitate the production plan of recycled parts like the second embodiment and can promote the production of materials by the closed-loop material recycling and that of materials by the open-loop material recycling to be easily programmed, also enhancing clear production planning and efficient production.

Figure 3:
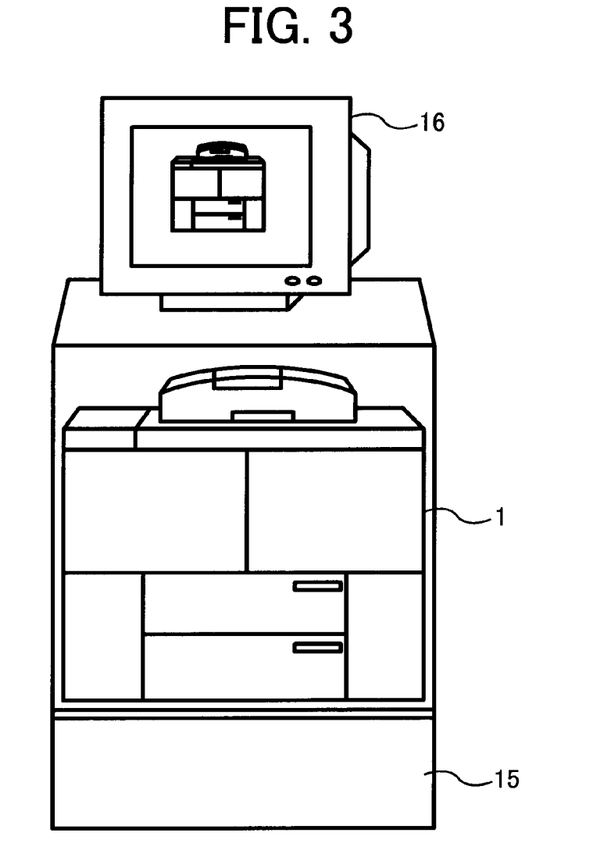
FIG. 3 is an external view showing a base and a display included in a fourth embodiment of the present invention.

Reference will be made to FIG. 3 for describing a fourth embodiment of the present invention relating to a method of disassembling/classifying a subject of recycling in the recycling system of any one of the first to third embodiments. As shown, the illustrative embodiment includes abase 15 to which the collected image forming apparatus 1 is mounted and a display 16 mounted on the upper portion of the base 15 for showing the operator of the base 15 a disassembling or classifying procedure. The illustrative embodiment additionally includes a finish switch 17, see FIG. 4, to be pressed by the operator every time the operator finishes a single disassembling or classifying operation. Disassembling and classifying sequences are stored in sequence storing means 18, see FIG. 4 beforehand.

Figure 4:
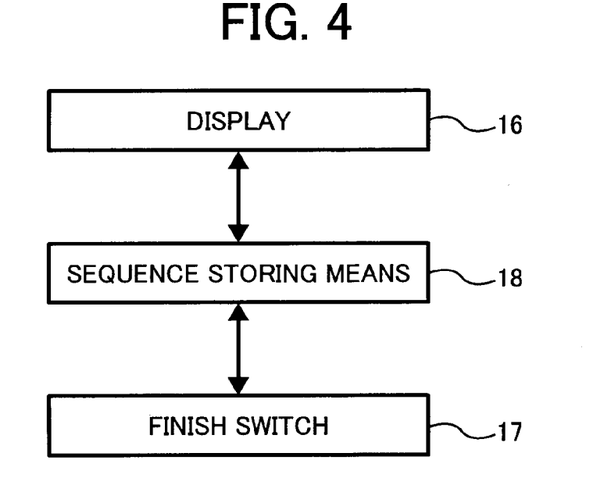
FIG. 4 is a schematic block diagram showing the display, a finish switch and sequence storing means also included in the fourth embodiment of the present invention.

More specifically, the storing means 18 is implemented by a conventional microcomputer including a CPU (Central Processing Unit), a ROM (Read Only Memory) and a RAM (Random Access Memory), although not shown specifically. While in the illustrative embodiment the sequence storing means 18 stores disassembling and classifying sequences exclusive for the image forming apparatus 1, it may additionally store classifying and disassembling sequences for other subjects of recycling and allow them to be selectively executed. As shown in FIG. 4, the display 16 and finish switch 17 are connected to the sequence storing means 18, so that a sequence read out of the storing means 18 is displayed on the display 16.

Figure 5:
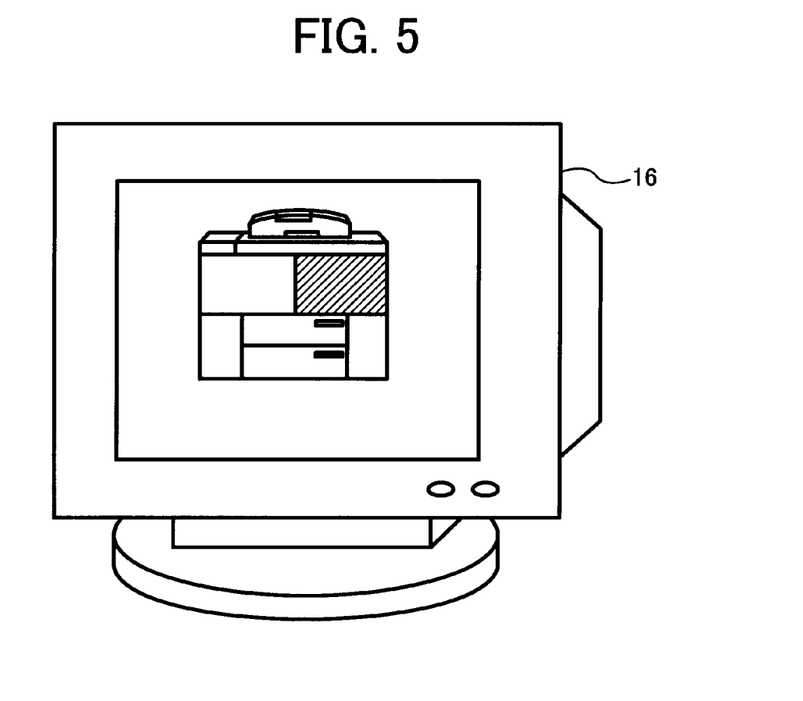
FIG. 5 is a view for describing the disassembling and classifying sequence of the fourth embodiment;.

In operation, as shown in FIG. 5, a portion of the image forming apparatus 1 to be disassembled first is displayed on the display 16, as indicated by hatching, while a disassembling sequence is displayed on the display 16 below the above portion in the form of, e.g., a message "Open the front cover and remove screws from the hinge". The operator performs the disassembling sequence in accordance with the above message and then presses the finish switch 17 when finished the sequence. In response, the finish switch 17 sends a finish signal to the sequence storing means 18, so that the next disassembling sequence is read out of the sequence storing means 18 and displayed on the display 16. Such a procedure is repeated until the operator disassembles the entire image forming apparatus 1.

It is sometimes necessary to turn around, tilt, raise or lower the image forming apparatus 1 during the disassembling or classifying procedure. In light of this, a motor, hydraulic or pneumatic cylinder, damper, rack and pinion mechanism or similar drive mechanism may be applied to the base 15 to allow the image forming apparatus 1 to be turned around, tilted, raised or lowered, as needed. This is successful to noticeably enhance efficient disassembling and classifying work.

The configuration described above allows the operator to perform disassembling or classifying work while watching the display 16 and therefore with efficiency. In addition, every time the operator finishes one disassembling or classifying operation, the next disassembling or classifying procedure is read out of the sequence storing means 18 and displayed on the display 16, implementing disassembling or classifying work matching with the operator's ability.

The illustrative embodiment may be modified such that the next disassembling or classifying work is automatically read out of the sequence storing means 18 and displayed on the display 16 at preselected intervals without using the finish switch 17. This allows the classifying or disassembling sequence to be managed on a time basis for thereby promoting efficient management and allows the operator's ability to be determined.

In summary, in accordance with the present invention, a subject of recycling contains recycle information in itself in place of the conventional barcode. Such recycle information saves time and labor for the operator to find a barcode or similar ID code by eye for hereby enhancing efficient operations. Further, the recycle information can be accurately detected even from part of the subject and therefore even when the subject is smeared or damaged, promoting accurate detection of information particular to the subject to thereby noticeably improving accuracy of recycling.

Various modifications will become possible for those skilled in the art after receiving the teachings of the present disclosure without departing from the scope thereof.

What is claimed is:

1. A disassembling and classifying method, implemented on a recycling system that collects a subject of recycling, which contains plastics, from a market and reprocesses said plastics to thereby produce a recycled product, comprising:
   irradiating said plastics with ultraviolet rays or an electromagnetic wave, the plastics containing an embedded line spectrum radiation that radiates light when receiving ultraviolet rays or an electromagnetic wave;

identifying recycle information particular to said subject of recycling in accordance with wavelengths of said light radiated from said line spectrum radiation;

determining whether the subject of recycling is damaged;

registering the subject of recycling as reusable or recyclable based upon the determination of whether the subject of recycling is damaged;

estimating a recycling cost of the subject of recycling when the subject of recycling is determined to be damaged;

displaying a disassembling and classifying sequence for said subject of recycling on a display;

determining whether the subject of recycling is reusable based on the identified recycle information and the stored disassembling and classifying sequency for said subject of recycling;

registering the subject of recycling as reusable or recyclable based further upon the determination of whether the subject of recycling is reusable;

estimating the recycling cost of the subject of recycling when it is further determined that the subject of recycling is not reusable; and determining whether a recycling process step may be omitted when the subject of recycling is registered as recyclable, wherein the recycling cost of the subject of recycling is estimated on the basis of the determination of whether the recycling process step may be omitted, the recycling cost of the subject of recycling is estimated to be a first cost when it is determined that the recycling process step may be omitted and the recycling process step includes a substantial processing step and an intermediate processing step, the recycling cost of the subject of recycling is estimated to be a second cost higher than the first cost when it is determined that the recycling process step may be omitted and the recycling process step includes the substantial processing step, and the recycling cost of the subject of recycling is estimated to be a third cost higher than the second cost when it is determined that the recycling process step may not be omitted.

2. The method as claimed in claim 1, further comprising:

displaying, on the display, an external appearance of the subject of recycling and a position of a part to be recycled, allowing an operator to see a disassembly and classification condition on said display by inputting a finish of a disassembling and classifying operation.

3. The method as claimed in claim 1, further comprising:

mounting the subject of recycling to a base which is elevatable, rotatable or tiltable in accordance with the disassembling and classifying sequence.

4. The method as claimed in claim 1, wherein the line spectrum radiation is uniformly diffused in the plastics.

5. The method as claimed in claim 1, wherein the line spectrum radiation is embedded in a portion of the plastic.

* * * * *